(12) United States Patent
Kowada

(10) Patent No.: US 8,245,503 B2
(45) Date of Patent: Aug. 21, 2012

(54) EXHAUST EMISSION CONTROL DEVICE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 347 days.

(21) Appl. No.: 12/524,889

(22) PCT Filed: Feb. 8, 2008

(86) PCT No.: PCT/JP2008/000180
§ 371 (c)(1),
(2), (4) Date: Jul. 29, 2009

(87) PCT Pub. No.: WO2008/096548
PCT Pub. Date: Aug. 14, 2008

(65) Prior Publication Data
US 2010/0000203 A1    Jan. 7, 2010

(30) Foreign Application Priority Data

Feb. 9, 2007    (JP) .................................. 2007-029923

(51) Int. Cl.
*F01N 3/24* (2006.01)
(52) U.S. Cl. ........................................... 60/295; 60/297
(58) Field of Classification Search .................... 60/286, 60/295–297, 301
See application file for complete search history.

(56) References Cited

U.S. PATENT DOCUMENTS

| | | | |
|---|---|---|---|
| 6,312,650 B1 * | 11/2001 | Frederiksen et al. | ......... 422/180 |
| 2008/0066451 A1 * | 3/2008 | Warner et al. | .................. 60/286 |

FOREIGN PATENT DOCUMENTS

| | | |
|---|---|---|
| EP | 0 558 452 A1 | 9/1993 |
| EP | 1 691 045 A1 | 8/2006 |
| EP | 1 748 162 A1 | 1/2007 |
| JP | 2004 108221 | 4/2004 |
| JP | 2005 42687 | 2/2005 |
| JP | 2005 155404 | 6/2005 |
| JP | 2006 320854 | 11/2006 |
| JP | 2007 40149 | 2/2007 |
| WO | WO 03/071104 A1 | 8/2003 |

OTHER PUBLICATIONS

U.S. Appl. No. 12/529,024, filed Aug. 28, 2009, Endo, et al.
U.S. Appl. No. 12/677,957, filed Mar. 12, 2010, Kowada, et al.
U.S. Appl. No. 12/679,677, filed Mar. 24, 2010, Kowada.
U.S. Appl. No. 12/738,994, filed Apr. 21, 2010, Kowada.
U.S. Appl. No. 12/742,321, filed May 11, 2010, Kowada, et al.
U.S. Appl. No. 12/525,689, filed Aug. 4, 2009, Kowada.

\* cited by examiner

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An exhaust emission control device having a particulate filter incorporated in an exhaust pipe, a selective reduction catalyst capable of selectively reacting NOx with ammonia under the presence of oxygen being arranged downstream of the particulate filter, and urea water as a reducing agent which is adapted to be added between the selective reduction catalyst and the particulate filter is disclosed. The particulate filter is arranged in parallel with the selective reduction catalyst. An S-shaped communication passage is arranged for introduction of the exhaust gas from a rear end of the particulate filter to a front end of the adjacent selective reduction catalyst in a forward folded manner. An urea water addition injector is arranged midway of the communication passage.

14 Claims, 3 Drawing Sheets

EXHAUST EMISSION CONTROL DEVICE

TECHNICAL FIELD

The present invention relates to an exhaust emission control device.

BACKGROUND ART

Conventionally, some diesel engines have selective reduction catalyst incorporated in an exhaust pipe through which exhaust gas flow, said catalyst having a feature of selectively reacting $NO_x$ with a reducing agent even in the presence of oxygen. A required amount of reducing agent is added upstream of the reduction catalyst and is reacted on the catalyst with $NO_x$ (nitrogen oxides) in the exhaust gas to thereby reduce a concentration of the discharged $NO_x$.

Meanwhile, effectiveness of ammonia ($NH_3$) used as a reducing agent for reduction and purification of $NO_x$ is well known in a field of industrial flue gas denitration, for example, in a plant. However, in a field of automobile where safety is hard to assure as to running with ammonia itself being loaded, researches have been made nowadays on use of nontoxic urea water as reducing agent.

More specifically, when the urea water is added to the exhaust gas upstream of the selective reduction catalyst, the urea water is thermally decomposed into ammonia and carbon dioxide gas according to the following equation to depurate $NO_x$ in the exhaust gas through reduction by the ammonia on the catalyst.

$$(NH_2)_2CO + H_2O \rightarrow 2NH_3 + CO_2 \quad \text{[Equation 1]}$$

For exhaust emission control of the diesel engine, mere removal of $NO_x$ in the exhaust gas is insufficient; particulates (particulate matter) in the exhaust gas must be captured through a particulate filter. This kind of particulate filter employed requires to be timely regenerated by burning off the particulates to prevent increase of exhaust resistance due to clogging.

To this end, it has been conceived to additionally arrange flow-through type oxidation catalyst in front of the particulate filter; with accumulation of the particulates becoming increased, fuel is added to the exhaust gas upstream of the oxidation catalyst to forcibly regenerate the particulate filter.

More specifically, the fuel is added to the exhaust gas upstream of the oxidation catalyst to bring about oxidation reaction of the added fuel (HC) during passing of the fuel through the oxidation catalyst. The exhaust gas elevated in temperature by the reaction heat flows into the particulate filter arranged just behind so that temperature of a catalyst floor of the particulate filter is elevated to burn off the particulates, thereby attaining the regeneration of the particulate filter.

As actual measures for carrying out the above-mentioned fuel addition, it has been generally conceived that main injection of the fuel near a compression upper dead center is followed by post injection at non-ignition timing after the compression upper dead center so as to add the fuel to the exhaust gas. For effective utilization of the added fuel in forced regeneration of the catalyst and in order to conduct oxidization treatment of the added fuel before substantial lowering in temperature of the exhaust gas, it has been conceived preferable to arrange the particulate filter upstream of the selective reduction catalyst (see, for example, Patent Literature 1 mentioned below).

[Patent Literature 1] JP 2005-42687A

SUMMARY OF INVENTION

Technical Problems

However, such arrangement of the particulate filter upstream of the selective reduction catalyst brings about the addition of urea water to the selective reduction catalyst being conducted between the particulate filter and the selective reduction catalyst. As a result, in order to ensure sufficient reaction time for thermal decomposition of the urea water added to the exhaust gas into ammonia and carbon dioxide gas, it is necessary to prolong a distance between an added position of the urea water and the selective reduction catalyst; as a result, the particulate filter and the selective reduction catalyst must be substantially spaced apart from each other by an ample distance, which extremely impairs the mountability on a vehicle.

The invention was made in view of the above and has its object to realize a compact arrangement of a particulate filter and selective reduction catalyst while ensuring sufficient reaction time for generation of ammonia from urea water, thereby improving mountability on a vehicle.

Solution to Problems

The invention is directed to an exhaust emission control device comprising a particulate filter incorporated in an exhaust pipe for capturing particulates in exhaust gas, and selective reduction catalyst downstream of said particulate filter and capable of reacting $NO_x$ with ammonia even in the presence of oxygen, urea water as reducing agent being adapted to be added between said selective reduction catalyst and said particulate filter, characterized in that said particulate filter and said selective reduction catalyst are arranged in parallel with each other, that an S-shaped communication passage is arranged for introduction of the exhaust gas from a rear end of the particulate filter to a front end of the adjacent selective reduction catalyst in a forward folded manner and that urea water addition means for addition of urea water is arranged midway of said communication passage.

Thus, the exhaust gas from the rear end of the particulate filter is introduced into the front end of the adjacent selective reduction catalyst through the forward folded communication passage, which ensures a long distance between an added position of the urea water midway of the communication passage and the selective reduction catalyst and facilitates mixing of the urea water with the exhaust gas due to fold-back of and thus turbulence of the exhaust gas flow, resulting in ensuring of sufficient reaction time for generation of ammonia from the urea water.

Moreover, the particulate filter and the selective reduction catalyst are arranged in parallel with each other and the communication passage is arranged along and between the particulate filter and the selective reduction catalyst, so that the whole structure becomes compact in size to substantially improve the mountability on a vehicle.

In specifically carrying out the invention, it is preferable that the S-shaped communication passage for communication between the rear end of the particulate filter and the front end of the selective reduction catalyst comprises a gas gathering chamber for encompassing the rear end of the particulate filter to gather the exhaust gas just discharged from the rear end of the particulate filter through substantially perpendicular turnabout of the exhaust gas by collision of the gas against a wall surface of the gathering chamber, a mixing pipe for extracting forward the exhaust gas gathered by the gathering chamber and a gas dispersing chamber for encompassing the front end of the selective reduction catalyst to guide into the reduction catalyst the exhaust gas guided forward by said mixing pipe and dispersed through substantially perpendicular turnabout of the exhaust gas by collision of the gas against a wall surface of the dispersing chamber.

Further, it is preferable in the invention that oxidation catalyst is arranged just in front of the particulate filter for oxidization treatment of unburned fuel in the exhaust gas, fuel addition means for addition of the fuel in the exhaust gas being arranged upstream of the oxidation catalyst. Thus, the fuel added by the fuel addition means undergoes oxidization treatment by means of the oxidation catalyst, so that the exhaust gas elevated in temperature by the reaction heat flows into the particulate filter arranged just behind to elevate the catalyst floor temperature and burn off the particulates, thereby attaining regeneration of the particulate filter.

In this case, it is preferable that a fuel injection device for injection of the fuel to respective cylinders of an engine is applied as fuel addition means and the fuel addition is conducted such that the injection of the fuel to the cylinders is controlled to leave much unburned fuel in the exhaust gas.

It is furthermore preferable in the invention that ammonia reducing catalyst for oxidization treatment of surplus ammonia is arranged just behind the selective reduction catalyst, which makes it possible to conduct oxidization treatment of the surplus ammonia after use of ammonia in the reduction reaction on the selective reduction catalyst by means of the ammonia reducing catalyst arranged just behind.

Advantageous Effects of Invention

According to an exhaust emission control device of the invention as mentioned in the above, the following effects and advantages can be obtained.
(I) While ensuring sufficient reaction time for generation of ammonia from the urea water, the compact arrangement of the particulate filter and selective reduction catalyst can be realized, thereby substantially improving the mountability on a vehicle more than ever before.
(II) When the oxidation catalyst is arranged just before the particulate filter for oxidization treatment of unburned fuel in the exhaust gas, the fuel added by the fuel addition means undergoes oxidization treatment by means of the oxidation catalyst, the exhaust gas elevated in temperature by the reaction heat flowing into the particulate filter arranged just behind to elevate the catalyst floor temperature and burn off the particulates, thereby attaining positive regeneration of the particulate filter.
(III) When the ammonia reducing catalyst for oxidization treatment of the surplus ammonia is arranged just behind the selective reduction catalyst, the surplus ammonia having passed through the selective reduction catalyst without reaction can undergo oxidization treatment into detoxification. Thus, ammonia is prevented from being left in the final exhaust gas to be discharged to the atmosphere.

Figure 1:
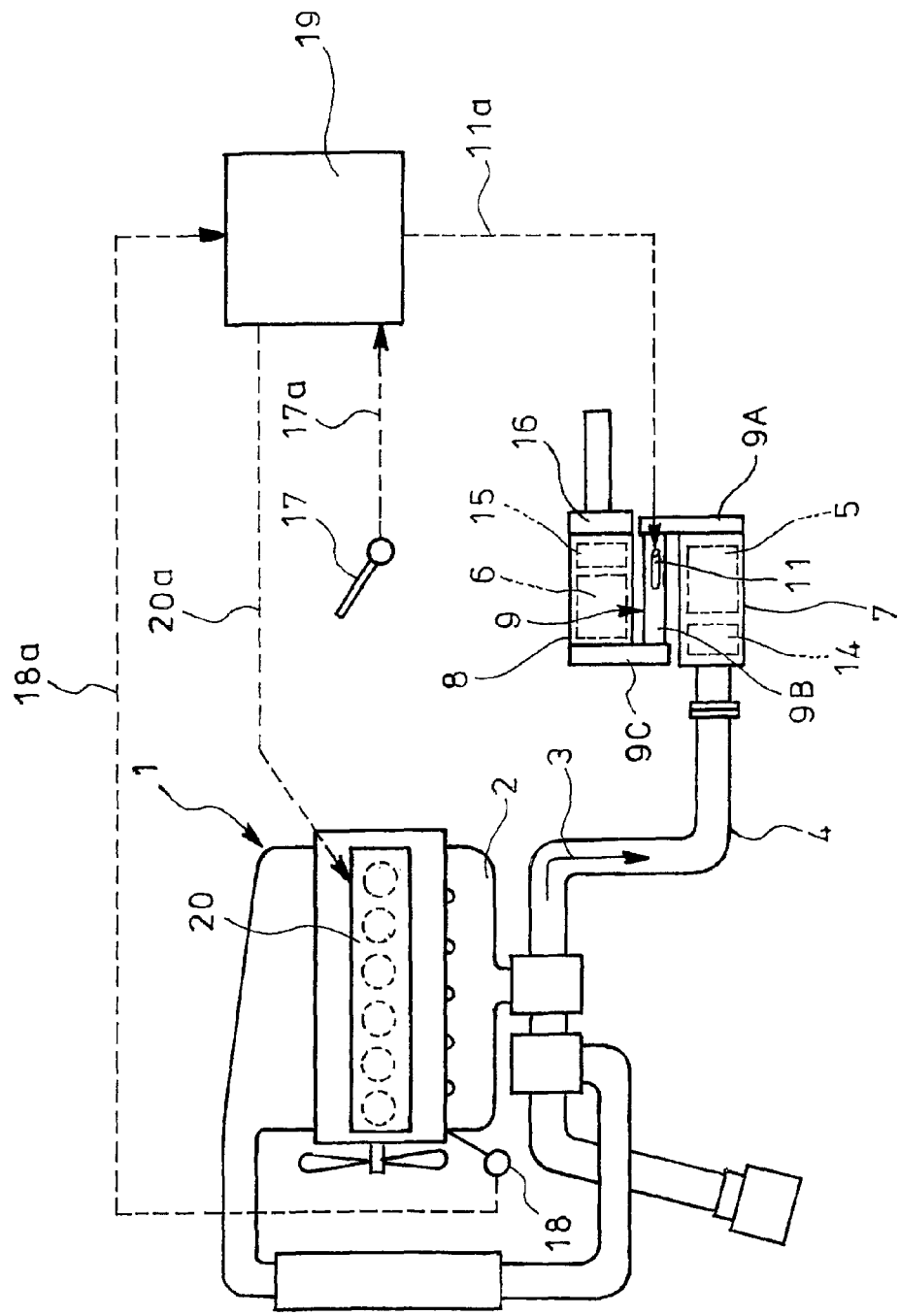
FIG. 1 is a schematic view showing an embodiment of the invention.

REFERENCE SIGNS LIST 1 diesel engine (engine)
3 exhaust gas
4 exhaust pipe
5 particulate filter
6 selective reduction catalyst
9 communication passage
9A gas gathering chamber
9B mixing pipe
9C gas dispersing chamber
11 urea water addition injector (urea water addition means)
14 oxidation catalyst
15 ammonia reducing catalyst
20 fuel injection device (fuel addition means)

DESCRIPTION OF EMBODIMENT

An embodiment of the invention will be described in conjunction with the drawings.

FIG. 1 shows the embodiment of the invention. In the embodiment of the exhaust emission control device, incorporated in an exhaust pipe 4 through which exhaust gas 3 flows from a diesel engine 1 via an exhaust manifold 2 is a particulate filter 5 housed in a casing 7 to capture particulates in the exhaust gas 3; arranged downstream of and in parallel with the particulate filter 5 and housed in a casing 8 is selective reduction catalyst 6 having a property capable of selectively reacting $NO_x$ with ammonia even in the presence of oxygen. A rear end of the particulate filter 5 is connected to an front end of the selective reduction catalyst 6 through an S-shaped communication passage 9 such that the exhaust gas 3 discharged through the rear end of the particulate filter 5 is passed via forward turnabout into the front end of the neighboring selective reduction catalyst 6.

Figure 2:
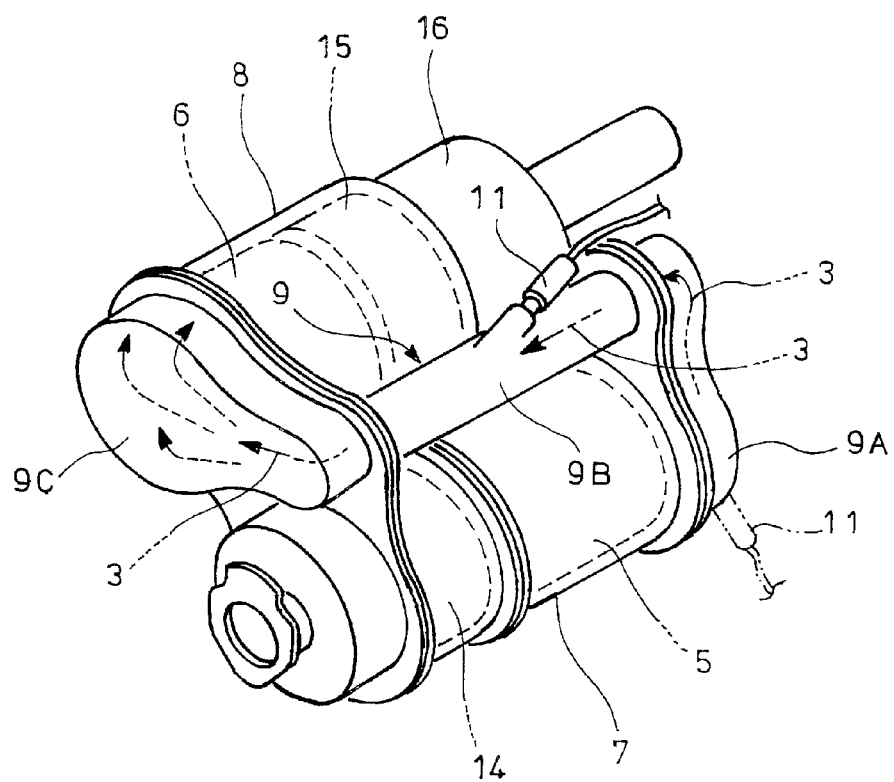
FIG. 2 is a perspective view showing in enlarged scale important parts in FIG. 1.

As shown in FIG. 2 which shows important parts in enlarged scale, the communication passage 9 is an S-shaped structure comprising a gas gathering chamber 9A which encircles the rear end of the particulate filter 5 to gather the exhaust gas 3 through substantially perpendicular turnabout of the gas just discharged from the rear end of the particulate filter by collision of the gas against a wall surface of the gathering chamber, a mixing pipe 9B which extracts forward the exhaust gas 3 gathered by the gathering chamber 9A and which is provided with a urea water addition injector 11 (urea water addition means) midway of the mixing pipe, and a gas dispersing chamber 9C which encircles the front end of the selective reduction catalyst 6 such that, through substantially perpendicular turnabout and dispersion of the gas 3 guided forward by the mixing pipe 9B by collision of the gas against a wall surface of the dispersing chamber, the dispersed exhaust gas 3 is introduced into the front end of the selective reduction catalyst 6.

Exemplified in the illustrated embodiment is the urea water addition injector 11 arranged midway of the mixing pipe 9B; alternatively, as shown in two-dot-chain lines in FIG. 2, the gas gathering chamber 9A may be provided with the urea water addition injector 11.

Especially in the embodiment, arranged in front of the particulate filter 5 in the casing 7 is oxidation catalyst 14 for oxidization treatment of unburned fuel in the exhaust gas 3 and arranged behind the selective reduction catalyst 6 in the casing 8 is ammonia reducing catalyst 15 for oxidization treatment of surplus ammonia, a rear portion of the casing 8 being formed with an exhaust chamber 16 having a tail pipe directed rearward.

Further, as shown in FIG. 1, an accelerator pedal in a driver's cabin is provided with an accelerator sensor 17 (load sensor) for detection of an accelerator-pedal stamping degree as load on the diesel engine 1. The engine 1 is provided, at its appropriate position, with a revolution sensor 18 for detection of a revolution speed thereof. An accelerator-pedal stamping degree signal 17*a* and a revolution speed signal 18*a* from the accelerator sensor 17 and the revolution sensor 18, respectively, are input to a controller 19 as engine control computer (ECU: electronic control unit).

In the controller 19, depending upon present vehicle operational conditions judged from the signals 17*a* and 18*a*, a fuel injection signal 20*a* for command of fuel injection timing and amount is output to a fuel injection device 20 for injection of fuel into the respective cylinders.

The fuel injection device 20 is constituted by a plurality of injectors (not shown) each for each of the cylinders. An electromagnetic valve of each of the injectors is appropriately valve-opening controlled by the fuel injection signal 20*a* from the controller 19 to properly control fuel injection timing and amount (valve-opening time period).

In the embodiment, the controller 19 decides the fuel injection signal 20*a* for normal mode on the basis of the accelerator-pedal stamping degree signal 17*a* and the revolution speed signal 18*a*. When it becomes necessary to conduct forced regeneration of the particulate filter 5, changeover is made from normal mode to regeneration mode, and the fuel injection signal 20*a* is decided such that the main injection of fuel conducted near the compression upper dead center (crank angle 0°) is followed by post injection at non-ignition timing (commencing timing in the range of crank angle 90°-130°) after the compression upper dead center.

More specifically, in the illustrated embodiment, the fuel injection device 20 is applied as fuel addition means. The main injection is followed by the post injection at non-ignition timing after the compression upper dead center as mentioned in the above, unburned fuel (mainly hydrocarbon: HC) being added to the exhaust gas 3 by such post injection. The unburned fuel undergoes oxidization treatment during its passing through the oxidation catalyst 14 in front of the particulate filter 5, and the exhaust gas 3 elevated in temperature by the reaction heat flows into the particulate filter 5 arranged just behind, whereby the catalyst floor temperature is elevated to burn off the particulates.

Extracted in the controller 19 are the revolution speed of the diesel engine 1 and the fuel injection amount derived from the output value of the fuel injection signal 20*a*. A basic particulate generation amount in the current operating condition of the diesel engine 1 is estimated depending upon these extracted data on the engine speed and the fuel injection amount, using a map of particulate generation amount. The estimated basic particulate generation amount is multiplied by a correction factor applied in consideration of various parameters on generation of the particulates and then an amount of the particulates burned off in the current engine operation state is subtracted therefrom to obtain a final particulate generation amount. Such final particulate generation amount is momentarily submitted to a cumulative computation to estimate an accumulated amount of the particulates. When the accumulated amount of the particulates thus estimated reaches a predetermined target value, switching is made from the normal mode to the regeneration mode so that the fuel is added to the exhaust gas 3 upstream of the particulate filter 5.

There have been various proposals for estimating such accumulated amount of the particulates; other methods than is illustrated above may be, of course, employed for estimation of the accumulated amount of the particulates. For example, the accumulated amount of the particulates may be estimated on the basis of differences in pressure before and after the particulate filter or estimated in terms of operation time or travel distance.

In addition, estimated in the controller 19 is a generated amount of $NO_x$ on the basis of, for example, the revolution speed of the diesel engine 1 and the fuel injection amount. Addition of a required amount of urea water commensurate with the generated amount of $NO_x$ is commanded to the urea water addition injector 11 in the form of the valve-opening command signal 11*a*.

With the exhaust emission control device thus constructed, the particulates in the exhaust gas 3 are captured by the particulate filter 5. Midway of the mixing pipe 9B downstream of the filter, the urea water is added to the exhaust gas 3 by the urea water addition injector 11 and is thermally decomposed into ammonia and carbon dioxide gas. On the selective reduction catalyst 6, $NO_x$ in the exhaust gas 3 is satisfactorily reduced by the ammonia. As a result, the particulates and $NO_x$ in the exhaust gas 3 are concurrently reduced.

In this case, the exhaust gas 3 from the rear end of the particulate filter 5 is introduced into the front end of the adjacent selective reduction catalyst 6 through the forward folded communication passage 9, which ensures a long distance between an added position of the urea water midway of the communication passage 9 and the selective reduction catalyst 6 and facilitates mixing of the urea water with the exhaust gas 3 due to fold-back of and thus turbulence of the exhaust gas flow, resulting in ensuring of sufficient reaction time for generation of ammonia from the urea water.

Especially in the embodiment, the exhaust gas 3 just discharged from the rear end of the particulate filter 5 is gathered through collision of the gas against wall surface of the gas gathering chamber 9A and substantially perpendicular turnabout of the gas, so that the exhaust gas 3 is introduced into the mixing pipe 9B in effectively turbulent state, which facilitates remarkably satisfactory mixing of the urea water added midway of the mixing pipe 9B.

The exhaust gas 3 guided forward by the mixing pipe 9B is collided against the wall surface of the gas dispersing chamber 9C into dispersion and substantially perpendicular turnabout, so that the exhaust gas 3 is dispersed and introduced into the front end of the selective reduction catalyst 6 without deflection.

Moreover, the particulate filter 5 and the selective reduction catalyst 6 are arranged in parallel with each other and the communication passage 9 is arranged along and between the particulate filter 5 and the selective reduction catalyst 6, so that the whole structure becomes compact in size to substantially improve the mountability on a vehicle.

Figure 3:
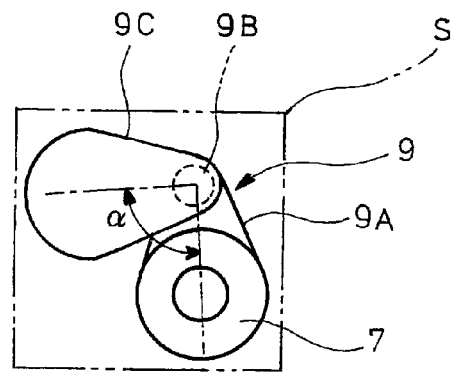
FIG. 3 is a view for explanation of the arranged condition when the parts shown in FIG. 2 are seen from a front.
Figure 4:
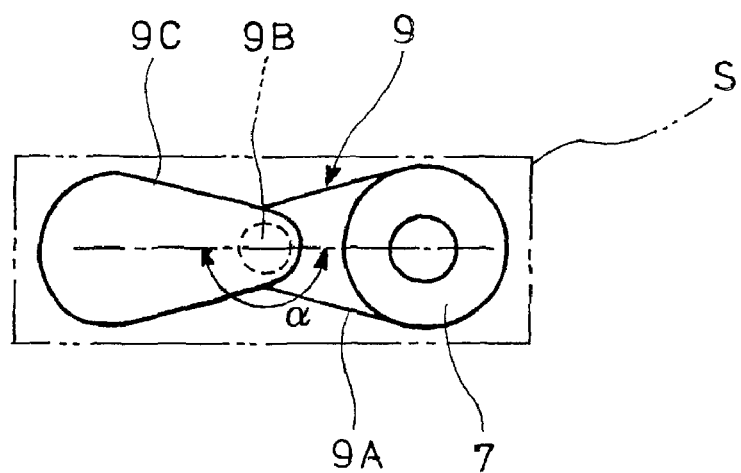
FIG. 4 is a view for explanation of the arranged condition in an application to a different vehicle shape.

For example, seeing the embodiment shown in FIGS. 1 and 2 from a front reveals that, as shown in FIG. 3, realized is a compact arrangement fitted into a relatively narrow mounting space S. Even the mounting space S which is a flattened space as shown in FIG. 4 vertically low and laterally wide depending on a vehicle shape may be easily coped with by changing a mounting angle α of the gas gathering and dispersing chambers 9A and 9C about the mixing pipe 9B to attain the compact arrangement in the mounting space S.

Moreover, such changeability in mounting posture through change of the mounting angle α of the gas gathering and dispersing chambers 9A and 9C about the mixing pipe 9B makes it possible to standardize parts such as the mixing pipe 9B and the gas gathering and dispersing chambers 9A and 9C even in application of the parts to different vehicle shapes.

When it becomes necessary to carry out forced regeneration of the particulate filter 5, of course, the fuel injection control in the controller 19 is changed over from the normal mode to the regeneration mode. Fuel added at the diesel engine 1 by post injection undergoes oxidization reaction at the preceding oxidation catalyst 14, and the exhaust gas 3 elevated in temperature by the reaction heat flows into the particulate filter 5 arranged just behind so that the catalyst floor temperature is elevated to burn off the particulates, thereby attaining the positive regeneration of the particulate filter 5.

Thus, according to the above embodiment, while ensuring enough reaction time for generation of ammonia from the urea water, the arrangement of the particulate filter 5 and the selective reduction catalyst 6 compact in size can be attained, substantially improving the mountability on a vehicle in comparison with the prior art.

Furthermore, the fuel added by the fuel injection device 20 upon post injection undergoes oxidization treatment on the oxidation catalyst 14, the exhaust gas 3 elevated in temperature by the reaction heat flows into the particulate filter 5 arranged just behind to elevate the catalyst floor temperature and burn off the particulates, attaining positive regeneration of the particulate filter 5.

Moreover, the surplus ammonia having passed through the selective reduction catalyst 6 without reaction can undergo oxidization treatment on the ammonia reducing catalyst 15 into detoxification. Thus, ammonia is prevented from being left in the final exhaust gas to be discharged to the atmosphere.

It is to be understood that an exhaust emission control device according to the invention is not limited to the above embodiment and that various changes and modifications may be made without departing from the scope of the invention. For example, in the above embodiment, the fuel injection device is applied as fuel addition means, and the fuel addition to the exhaust gas is conducted such that the main injection of fuel near the compression upper dead center is followed by post injection at non-ignition timing after the compression upper dead center. Alternatively, fuel addition to the exhaust gas may be conducted in the form of delaying the main injection to the cylinders than usual. Furthermore, in addition to such measure of fuel addition through control of the fuel injection into the cylinders to leave much unburned fuel in the exhaust gas, an injector as fuel addition means may be attached at an appropriate position on and extend into the exhaust pipe (or the exhaust manifold as alternated), fuel being added to the exhaust gas through direct injection by the injector.

The invention claimed is:

1. An exhaust emission control device comprising:
 a particulate filter incorporated in an exhaust pipe for capturing particulates in exhaust gas;
 a selective reduction catalyst downstream of said particulate filter and capable of reacting NOx with ammonia even in the presence of oxygen; and
 urea water as a reducing agent being adapted to be added between said selective reduction catalyst and said particulate filter,
 wherein said particulate filter and said selective reduction catalyst are arranged in parallel with each other as separate and distinct bodies,
 wherein a rear end of said particulate filter is connected to a front end of the selective reduction catalyst through an S-shaped communication passage such that, the exhaust gas from the rear end of the particulate filter is introduced into the front end of the adjacent selective reduction catalyst in a forward folded manner,
 wherein a straight intermediate portion of the communication passage extending linearly is arranged along an axis of the particulate filter and an axis of the selective reduction catalyst, the particulate filter and the selective reduction catalyst are configured to be pivotable about an axis of the straight intermediate portion to change mounted angles of the particulate filter and of the selective reduction catalyst about the straight portion, and
 wherein urea water addition means for addition of urea water are arranged midway of said communication passage.

2. An exhaust emission control device as claimed in claim 1, wherein the S-shaped communication passage for communication between the rear end of the particulate filter and the front end of the selective reduction catalyst comprises a gas gathering chamber for encompassing the rear end of the particulate filter to gather the exhaust gas just discharged from the rear end of the particulate filter through substantially perpendicular turnabout of the exhaust gas by collision of the gas against a wall surface of the gathering chamber, a mixing pipe for extracting forward the exhaust gas gathered by the gathering chamber and a gas dispersing chamber for encompassing the front end of the selective reduction catalyst to guide into the selective reduction catalyst the exhaust gas guided forward by said mixing pipe and dispersed through substantially perpendicular turnabout of the exhaust gas by collision of the gas against a wall surface of the dispersing chamber.

3. An exhaust emission control device as claimed in claim 2, wherein an oxidation catalyst for oxidization treatment of unburned fuel in the exhaust gas is arranged just in front of the particulate filter, fuel addition means for addition of fuel to the exhaust gas are arranged upstream of said oxidation catalyst.

4. An exhaust emission control device as claimed in claim 3, wherein a fuel injection device for injecting fuel to respective cylinders of an engine is applied as the fuel addition means and the fuel addition is conducted such that the injection of the fuel to the cylinders is controlled to leave much unburned fuel in the exhaust gas.

5. An exhaust emission control device as claimed in claim 4, wherein an ammonia reducing catalyst for oxidization treatment of surplus ammonia is arranged just behind the selective reduction catalyst.

6. An exhaust emission control device as claimed in claim 3, wherein an ammonia reducing catalyst for oxidization treatment of surplus ammonia is arranged just behind the selective reduction catalyst.

7. An exhaust emission control device as claimed in claim 2, wherein an ammonia reducing catalyst for oxidization treatment of surplus ammonia is arranged just behind the selective reduction catalyst.

8. An exhaust emission control device as claimed in claim 2, wherein said gas gathering chamber includes a first portion with an outer perimeter of similar size as an outer perimeter of a casing of the particulate filter and which is fitted on the rear end of the particulate filter, and a second portion with an outer perimeter of similar size as an outer perimeter of the mixing pipe and which is fitted on a first end of the mixing pipe.

9. An exhaust emission control device as claimed in claim 8, wherein said gas dispersing chamber includes a first portion with an outer perimeter of similar size as an outer perimeter of a casing of the selective reduction catalyst and which is fitted on the front end of the selective reduction catalyst, and a second portion with an outer perimeter of similar size as the outer perimeter of the mixing pipe and which is fitted on a second end of the mixing pipe.

10. An exhaust emission control device as claimed in claim 1, wherein an oxidation catalyst for oxidization treatment of unburned fuel in the exhaust gas is arranged just in front of the particulate filter, and fuel addition means for addition of fuel to the exhaust gas are arranged upstream of said oxidation catalyst.

11. An exhaust emission control device as claimed in claim 10, wherein a fuel injection device for injecting fuel to respective cylinders of an engine is applied as the fuel addition means and the fuel addition is conducted such that the injection of the fuel to the cylinders is controlled to leave much unburned fuel in the exhaust gas.

12. An exhaust emission control device as claimed in claim 11, wherein an ammonia reducing catalyst for oxidization treatment of surplus ammonia is arranged just behind the selective reduction catalyst.

13. An exhaust emission control device as claimed in claim 10, wherein an ammonia reducing catalyst for oxidization treatment of surplus ammonia is arranged just behind the selective reduction catalyst.

14. An exhaust emission control device as claimed in claim 1, wherein an ammonia reducing catalyst for oxidization treatment of surplus ammonia is arranged just behind the selective reduction catalyst.

* * * * *